United States Patent [19]
Kranitzky

[11] Patent Number: 4,791,579
[45] Date of Patent: Dec. 13, 1988

[54] PROCESS AND APPARATUS FOR GRAPHICALLY REPRESENTING A VARIABLE STRUCTURE IN PERSPECTIVE

[75] Inventor: Walter Kranitzky, Traunstein, Fed. Rep. of Germany

[73] Assignee: Dr. Johannes Heidenhain GmbH, Traunreut, Fed. Rep. of Germany

[21] Appl. No.: 661,179

[22] Filed: Oct. 15, 1984

[30] Foreign Application Priority Data

Oct. 26, 1983 [DE] Fed. Rep. of Germany ....... 3338765

[51] Int. Cl.$^4$ ............ G06F 15/40; H04F 1/266; G06G 7/48; G06K 9/00
[52] U.S. Cl. ........................ 364/518; 392/8; 340/729; 364/578; 364/512; 364/474.24
[58] Field of Search ............... 364/518, 520, 521, 171, 364/512, 578, 474; 340/729, 747; 382/1, 8, 28, 32, 34, 42

[56] References Cited

U.S. PATENT DOCUMENTS

| | | | |
|---|---|---|---|
| 4,222,048 | 9/1982 | Johnson | 340/747 |
| 4,490,781 | 12/1984 | Kishi et al. | 364/171 |
| 4,509,043 | 4/1985 | Mossaides | 340/729 |
| 4,521,860 | 6/1985 | Kanematsu et al. | 364/171 |
| 4,530,046 | 7/1985 | Munekata et al. | 340/724 |
| 4,556,833 | 12/1985 | Kishi et al. | 364/171 |
| 4,558,438 | 12/1985 | Jones et al. | 340/728 |

FOREIGN PATENT DOCUMENTS 3338765 5/1985 Fed. Rep. of Germany .

OTHER PUBLICATIONS

IBM Technical Disclosure Bulletin, vol. 20, No. 5, Oct. 1977.

Primary Examiner—Parshotam S. Lall
Assistant Examiner—Joseph L. Difon
Attorney, Agent, or Firm—Willian Brinks Olds Hofer Gilson & Lionel

[57] ABSTRACT

A method and apparatus for representing a processed workpiece in perspective with invisible covered edges on the picture screen of a numerically controlled machine tool includes the steps of resolving both the workpiece and the tool into equidistant sections and storing the coordinates of these sections in a RAM. In correspondence to the relative movements of the tool and workpiece determined by the numerical control program, the associated sections of the tool and workpiece are superimposed in an image point memory. With the aid of a simple algorithm the section contour of the workpiece is altered by the superposition is determined, and its coordinates are stored in the RAM. After this process has been completed for all section planes, all sections are successively fed into the image point memory, with succeeding sections offset by several image points in the X and Z directions with respect to the preceding sections. After each superposition, the algorithm is used to determine the resulting outer contour, which is applied to the display. Covered parts of sections lying in the background are not represented on the display, since they lie inside the outer contour determined up to that time.

18 Claims, 70 Drawing Sheets

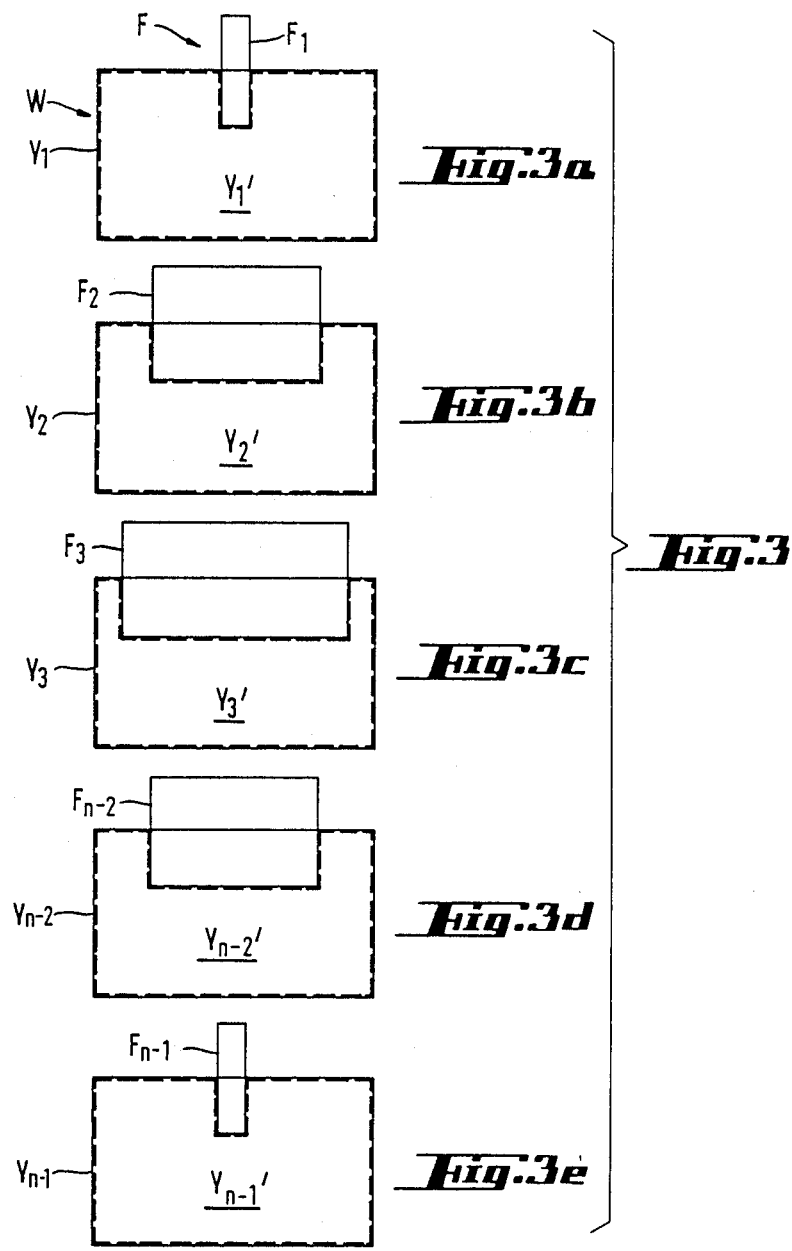

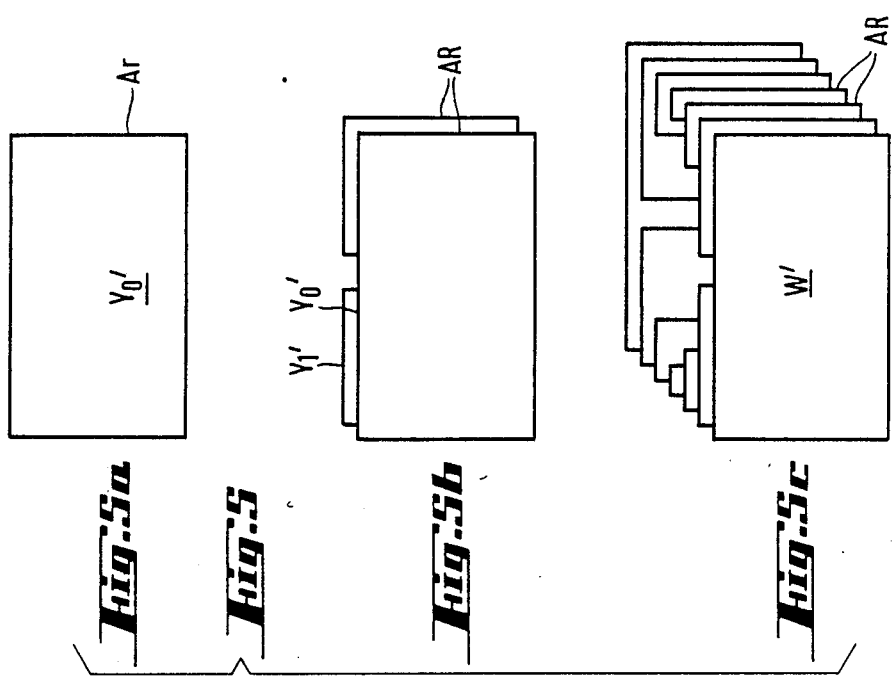
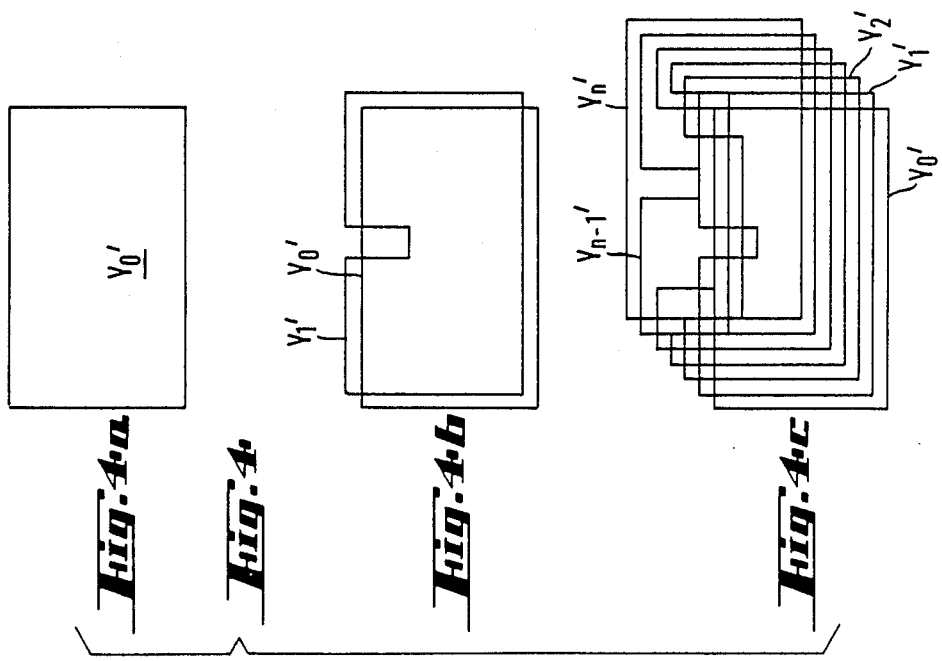

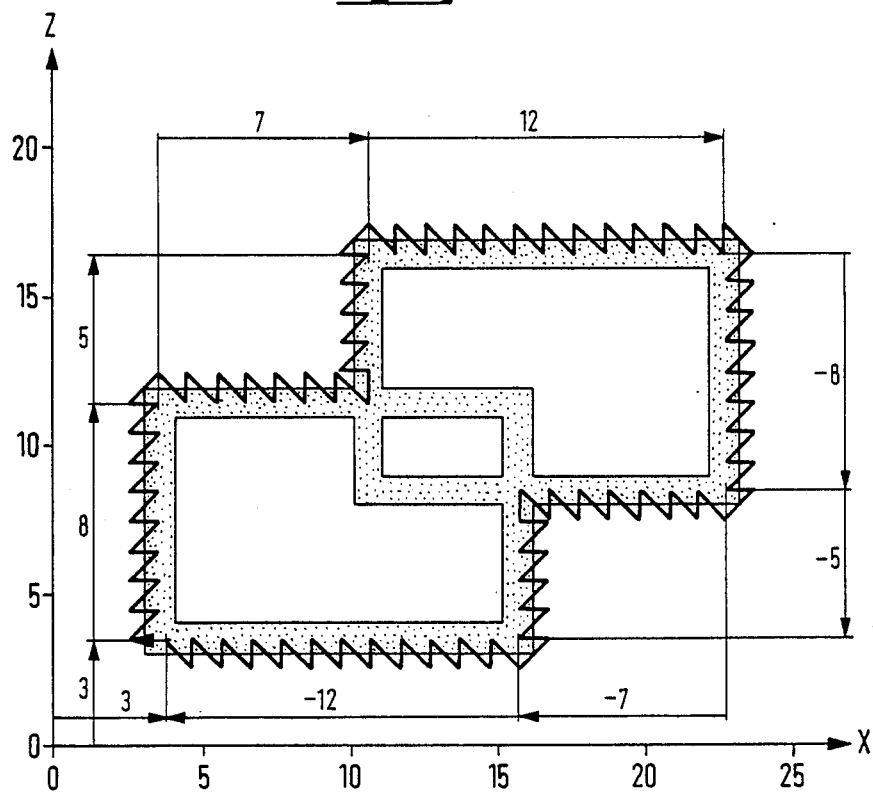

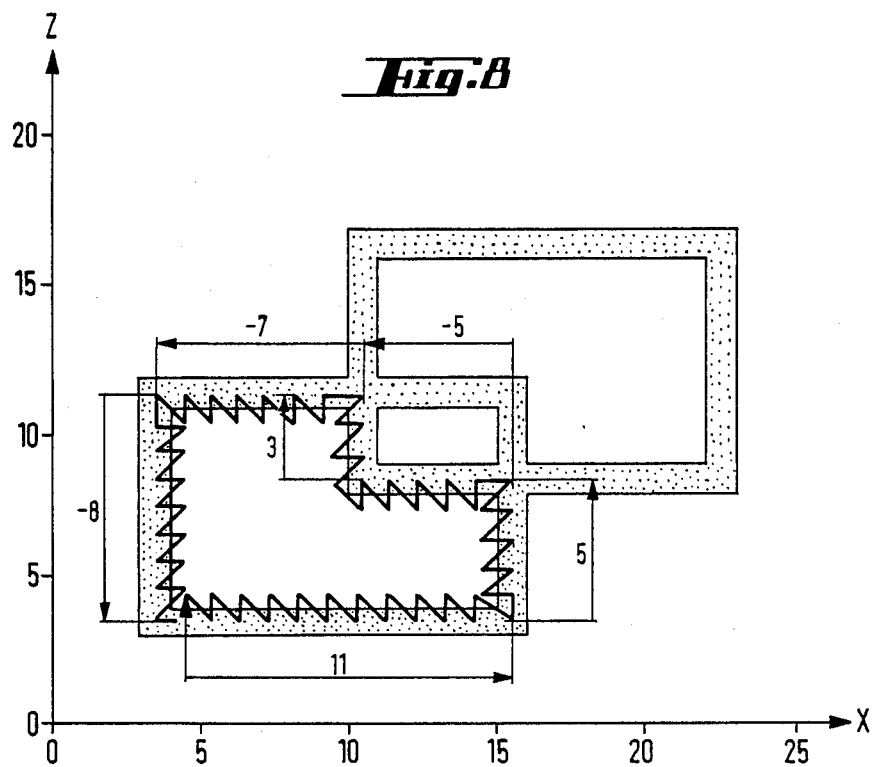

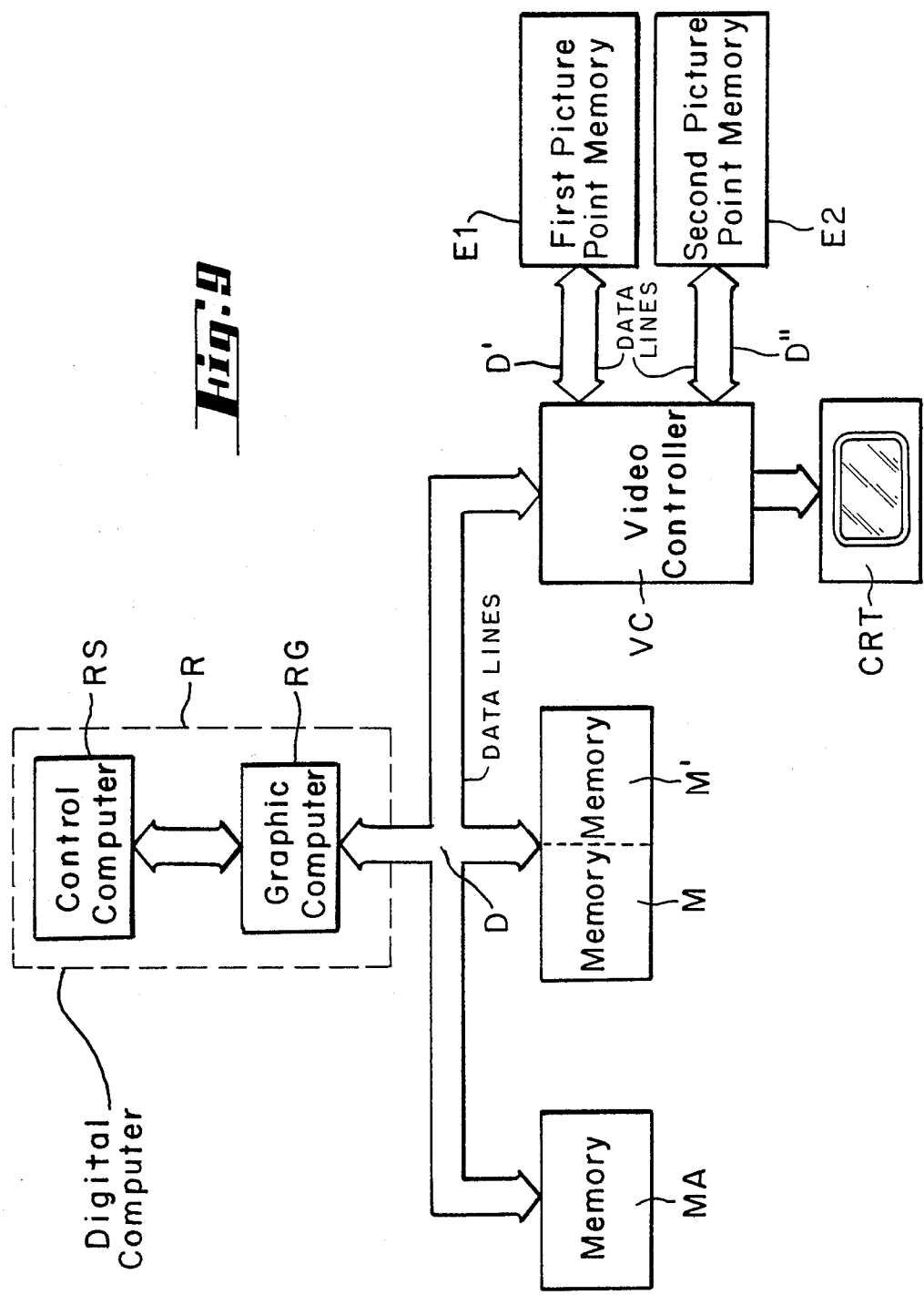

PROCESS AND APPARATUS FOR GRAPHICALLY REPRESENTING A VARIABLE STRUCTURE IN PERSPECTIVE

REFERENCE TO RELATED DISCLOSURE DOCUMENT

A related disclosure document was previously filed with the U.S. Patent and Trademark Office as Disclosure Document Ser. No. 122,334.

BACKGROUND OF THE INVENTION

The present invention relates to an improved method for generating a perspective graphic representation of a variable structure, such as a workpiece being processed in a numerically controlled machine tool, for example.

So-called CAD systems in general use today typically present a perspective graphic representation of an arbitrarily shaped body. However, in the past such perspective representations have been expensive to implement and have therefore found limited use in numerically controlled machine tools and related programming stations. Typically, such numerically controlled machine tools have in the past utilized a two dimensional representation of various views of the workpiece in order to assist in visualization by the operator.

Two prior art publications of interest include European Patent Application No. EP-A2-0 089 561 and European Patent Application No. EP-A2-0 089 562.

In addition, control systems such as that marketed under the trade name MAZATROL T-1 of the Yamazaki firm utilize three dimensional representations of a workpiece presented as a "transparent" wire model. Such transparent wire model representations can very quickly become difficult to use, since processing operations are generally represented only by the display of the center path of the tool.

The approaches to workpiece representation described above are not totally satisfactory, particularly when the graphic representation is used to check a previously programmed numerical control tool path for correction purposes.

SUMMARY OF THE INVENTION

The present invention is directed to an improved method for graphically representing an arbitrarily shaped object such as a workpiece on a display. The preferred embodiments of this invention are relatively low cost in terms of the apparatus and computation capacity required to implement the method. In spite of this economy of implementation, the present invention allows three dimensional representations of arbitrarily shaped structures in spatial parallel projection on a display, while edges and surfaces covered by image parts lying in the foreground remain invisible.

According to this invention, a method is provided for generating on a display of a machine tool controller a perspective representation of a variable three dimensional structure processed by an object. This method comprises the steps of resolving the structure into a plurality of structure sections and storing a first plurality of coordinates which define said structure sections in a section memory. Similarly, the object is resolved into a plurality of object sections which are stored as a second plurality of coordinates which define the object sections. The structure sections are then superimposed with corresponding ones of the object sections as determined by relative movement between the object and the structure in order to generate a plurality of modified structure sections. The first plurality of coordinates in the section memory are then altered to correspond to a plurality of inner contours defined by the modified structure sections. The modified sections are superimposed in an image point memory with adjacent ones of the modified sections offset from one another in at least one of two orthogonal directions and a resulting outer contour defined by the superimposed modified sections is then determined and displayed.

A particular advantage of the preferred embodiment described below is that a perspective representation of an arbitrarily complicated workpiece can be generated by the input of the tool movements necessary to produce the workpiece. In this way, it is possible to follow the action of each processing step on the workpiece directly on the display.

The calculations required to implement the preferred embodiment described below can be performed on currently available microprocessors. The storage requirements are dependent on the size and shape of the workpiece. However, only one kilobyte of memory is needed in the preferred embodiment in order to provide a three dimensional representation as described below. For this reason, the method of this invention is readily adapted to a wide variety of small microprocessor based systems. The important economies of the preferred embodiment described below are in large part a result of the fact that necessary calculations are arranged as simple, one bit operations instead of as complicated stereometric calculations. Instead of numerical section point calculations, the information present in an image point memory is directly evaluated.

The invention itself, together with further objects and attendant advantages, will be best be understood by reference to the following detailed description, taken in conjunction with the accompanying drawings.

BRIEF DESCRIPTION OF THE DRAWINGS

FIGS. 3a-3e represent a plurality of sequential superpositions of various workpiece sections with corresponding sections of the shaft milling tool.

FIGS. 4a-4c represent various superpositions of modified sections of the workpiece in an image point memory.

FIGS. 5a-5c correspond to FIGS. 4a-4c respectively, with resulting outer contours shown.

FIG. 7 is a schematic diagram showing the manner in which the algorithm of FIG. 6 can be used to determine an outer contour of two section planes offset obliquely with respect to one another.

FIG. 8 is a schematic diagram showing a manner in which the algorithm of FIG. 6 can be used to determine an inner contour resulting from two section planes obliquely offset with respect to one another.

FIG. 9 is a block diagram of a presently preferred system for implementing the method of this invention.

DETAILED DESCRIPTION OF THE PRESENTLY PREFERRED EMBODIMENTS

Figure 1:
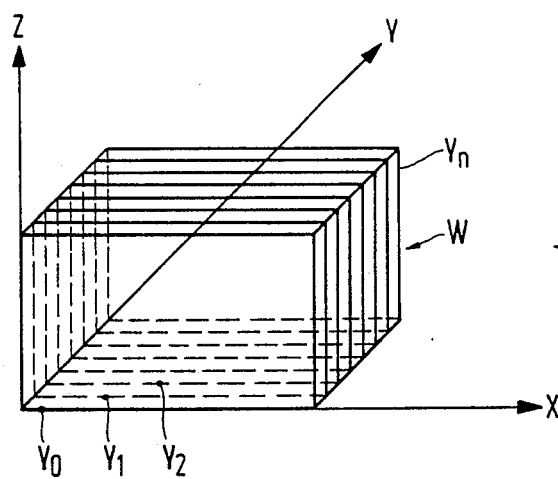
FIG. 1 is a graphic representation of a workpiece, in which an array of section planes is shown.

Turning now to the drawings, much of the following discussion is organized with respect to a three dimensional Cartesian coordinate system shown in FIG. 1 in which the front, left, lower corner of a workpiece W is situated at the origin of the coordinate system and the X and Z axes point in the plane of FIG. 1 to the right and upward, respectively. The Y axis points to the rear into the image space. In the preferred embodiment described below each workpiece W is stored internally in the form of the corner coordinates of a plurality of sections $Y_o$-$Y_n$, each of which is orientated perpendicularly to the Y axis. The distance between adjacent ones of the individual section planes $Y_o$-$Y_n$ is constant. The number of section planes $Y_o$-$Y_n$ depends upon the size of the workpiece W and the maximum resolution of the graphic representation that is required.

In computer memory, each of the sections $Y_i$ is represented as the X and Z coordinates of an origin corner point and as a set of X and Z vectors, each of which defines an additional corner point with respect to the respective proceeding corner point.

Figure 2:
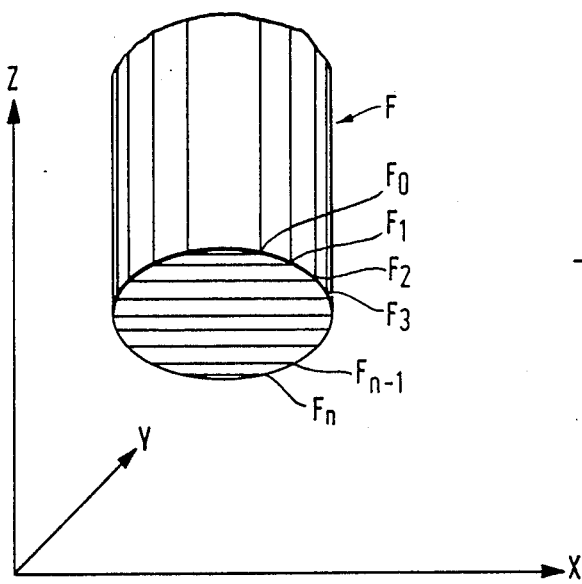
FIG. 2 is a partial schematic representation of a shaft milling tool in which an array of section planes is shown.

As shown in FIG. 2, the coordinates of sections $F_o$-$F_n$ of a tool F can be calculated in the same coordinate system. The tool F can for example be a shaft milling tool as shown in FIG. 2 represented by tool sections $F_o$-$F_n$. In the case of a circular cross section milling tool as shown in FIG. 2, the coordinates of the tool sections $F_o$-$F_n$ can be calculated for each of the tool sections $F_i$ as a sine function of the milling tool radius. Of course, the present invention is not limited to use with shaft milling tools and can readily be adapted to a wide variety of processing tools, including, for example, stamping dies.

The coordinate values of the workpiece sections $Y_o$-$Y_n$ are stored in a section memory M which can be embodied as a RAM. Similarly, the coordinates of the tool sections $F_o$-$F_n$ can likewise be stored in a RAM M' (see FIG. 9).

FIGS. 3a-3e show in simplified form the superposition of the workpiece sections $Y_1$-$Y_{n-1}$ of the workpiece W with the tool sections $F_1$-$F_{n-1}$ of the shaft milling tool F. In this embodiment, the superposition takes place in an image point memory E1 which contains all of the image information data in the form of image elements (so called pixels) (See FIG. 9). During processing, the content of the image point memory E1 is not directly displayed on the display CRT.

The superposition of the sections $F_i$ of the milling tool F and the sections $Y_i$ of the workpiece W are determined as a result of data supplied by a numerical control which controls the tool path or the workpiece path according to a stored program. The relative position of the tool F with respect to the workpiece W is commanded by the numerical control, and the sections $Y_i$, $F_i$ are superpositioned in a corresponding manner.

As shown in FIGS. 3a-3e, after the initial values for the center (X, Y) and height (Z) of the tool F are known, the superposition is accomplished by recording the foremost section of the workpiece W ($Y_1$) which is altered by the tool F in the image point memory E1. Then the section $F_1$ of the tool F that corresponds to the Y value $Y_1$ is likewise transferred into the image point memory E1 and the inner contour of the image is determined. The old section coordinates of the workpiece W are replaced by those of the modified inner contour $Y_1'$, as shown in FIG. 3a. This process is repeated until all of the required sections $Y_i'$ are modified as shown in FIGS. 3b-3e.

In the example of FIGS. 3a-3e, the milling tool F is merely vertically inserted into the workpiece W without lateral movement of the milling tool F with respect to the workpiece W. In the case of such processing steps, the modified workpiece W can then be displayed as described in detail below. In general, however, the tool F or the workpiece W is caused to move in an arbitrary path in space. In this event, the section coordinates must be modified as described above for each new tool position. Preferably, each section $Y=Y_n$ of the workpiece W is processed only once per numerical control set, as all tool cuts defined for the value $Y=Y_n$ by the numerical control set are successively transferred into the picture point memory E1, and only finally is the inner contour determined, when all of the processing operations for the section $Y_i$ concerned are concluded.

The section coordinates of the modified workpiece sections $Y_o'$-$Y_n'$ are stored as new section coordinates in the section memory M.

For the construction of a perspective image of the processed workpiece W', the modified sections $Y_o'$-$Y_n'$ are stored in the picture point memory E1. These steps of the preferred embodiment of the process of this invention are shown in FIGS. 4a-4c and FIGS. 5a-5c.

First, as shown in FIG. 4a, the foremost workpiece section $Y_o'$ is stored in the picture point memory E1 and a resulting outer contour AR is determined therefrom.

Since in this example the milling tool F has not processed the foremost section $Y_o$, the contour of the processed section $Y_o'$ is the same as the original contour $Y_o$. The resulting outer contour AR is shown on the display, as shown in FIG. 5a.

The second section $Y_1'$ immediately behind the foremost section $Y_o$ is then displayed. In this example the second section $Y_1'$ has been modified by a material removal step, and the modified contour is entered from the section memory M into the image point memory E1. In this storing operation the new contour of the section $Y_1'$ is shifted by several picture elements in the X and Z directions with respect to the foremost section $Y_o'$, as shown in FIG. 4b.

Then the resulting outer contour AR is determined in the picture point memory E1 with the aid of the now registered image information data. This outer contour AR is represented as shown in FIG. 5b on the display.

Similarly, the additional sections $Y_2'$-$Y_n'$ are successively recorded in the previously described manner in the picture point memory E1. After each section has been stored, the resulting outer contour AR is determined with the aid of the stored image information, and is then displayed.

FIG. 4c represents the last stage in which all of the modified sections $Y_o'$-$Y_n'$ have been stored in the picture point memory E1. The resulting outer contours AR determined with the aid of this image information are represented in FIG. 5c. FIG. 5c corresponds to the image of the processed workpiece W', as represented on the display of the numerical control to the operator.

The portions of sections lying to the rear which are covered by the sections lying in the foreground are automatically not transmitted to the display, since they lie within the previously determined outer contours AR.

By altering the displacement of the modified sections $Y_o'$-$Y_n'$ with respect to one another, the angle of viewing can be varied. Thus, oblique perspective views from various sides are possible. If the sequence of section processing is reversed, then perspective representations of the back of the workpiece W' can be generated. By interchanging the incremental coordinate values within each section (for example, X=Z; Z=−X), it is possible to represent the workpiece W' rotated through ±90° lying on its side, or rotated through 180° with the bottom pointed upward. Furthermore, various perspective views of bisected workpieces W' can be generated by starting the three dimensional representation at a section located in the middle of the workpiece.

Other alternatives that can be used in conjunction with this invention relate to the use of color graphics. For example, various side surfaces can be represented in a simple manner in different colors. The dimensioning of the workpiece W' can be clarified by color emphasis, for example, of every tenth section $Y_{10}'$.

Moreover, a zoom function can be implemented by treating from the outset an enlarged portion of the workpiece W in the above described manner.

Of course, the display can be a cathode ray tube or any other suitable display device, such as a plotter or the like. Furthermore, the numerical control can be replaced by a programming station or the like.

Figure 6:
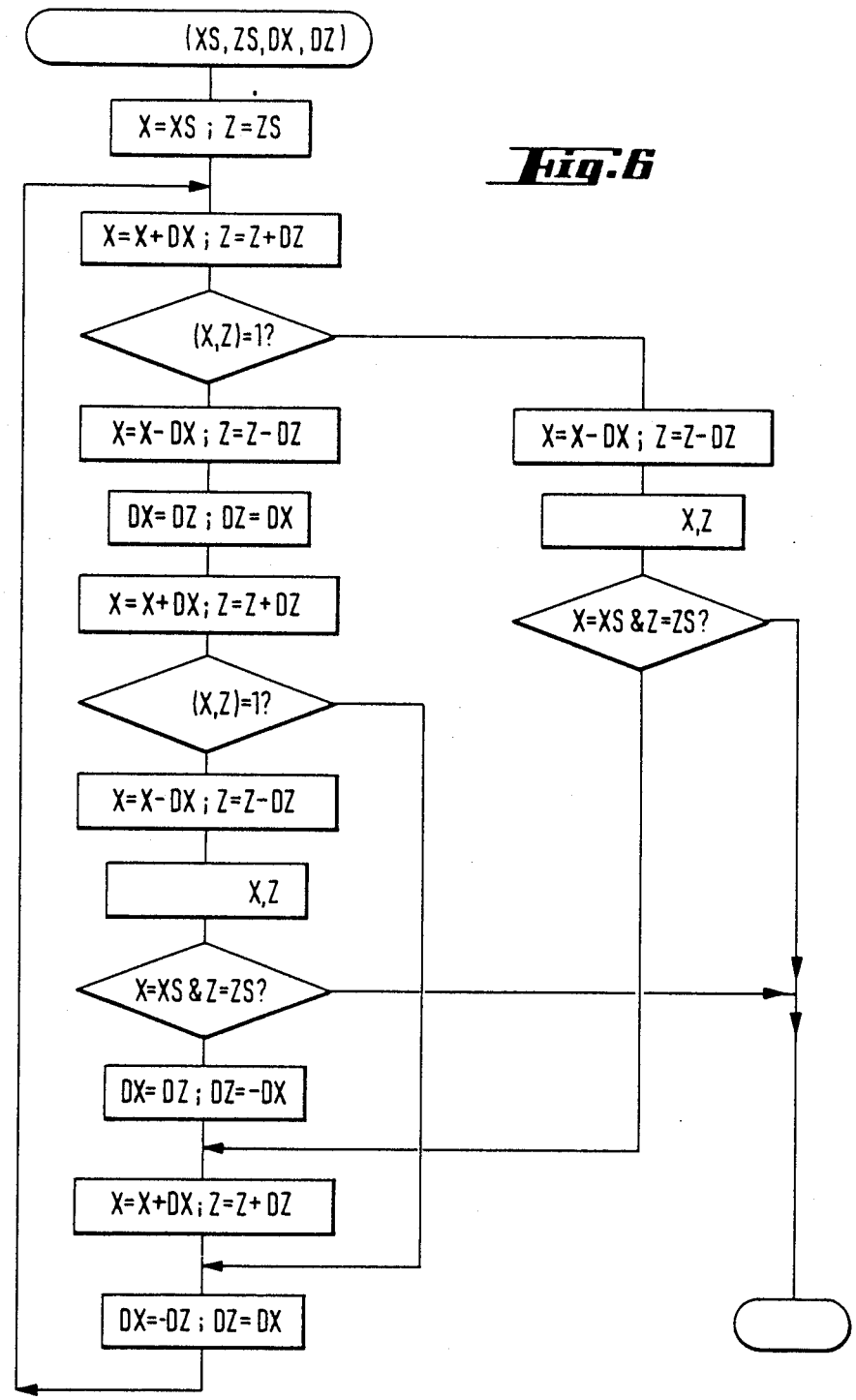
FIG. 6 is a flow chart of an algorithm suitable for determining inner and outer contours.

The above described determination of the inner contours of the altered sections Y' and the resulting outer contours AR are performed in the preferred embodiment by a simple algorithm, the flow chart of which is shown in FIG. 6. This algorithm is used for the actualization of the section coordinates according to a tool movement, and is described in FIG. 6 in complete detail.

An important point related to the great simplicity of this preferred embodiment is the fact that this algorithm requires only single bit operations to be carried out.

Since any arbitrarily curved line can be approximated by a series of steps, the method described above can be used to determine the intersection points of circles, straight lines, elipses and the like. The algorithm described in FIG. 6 determines the polygonal course of an outer or inner contour of an image built up of an arbitrarily large number of vertical and horizontal lines.

FIG. 7 provides an illustration of the manner in which the algorithm of FIG. 6 can be used to determine an outer contour. FIG. 7 is a diagram made up of two rectangles of equal size obliquely offset with respect to one another. This diagram can be transformed and stored by the vector generator of a graphic display controller into a picture point memory of a picture screen. The initial parameters needed are the coordinate values $X_o$, $Z_o$ of an arbitrary point on the contour to be determined and the direction of an adjacent contour point relative to the starting point. In the example, the left lower corner of the picture is defined as the starting point $X_o=3$, $Z_o=3$. The adjacent point lies in a positive Z direction. The algorithm shown in FIG. 6 is used to determine whether the picture point X=2, Z=3, lying to the left of the starting point, is set or erased. From this information there is obtained the coordinate of the next picture point X=3, Z=4 to be tested and so forth. In FIG. 7 the sequence of test steps is shown as a sawtooth line. A corner point of the contour is reached when the picture point tested after a jump in the diagonal direction (to the right and above; ΔX=+1, ΔZ=+1) is erased (an outer corner) or when the picture point sensed after a jump to the left (ΔX=−1, ΔZ=0) is set (an inner corner). If either one of these two conditions is detected, then the coordinates of the corner part are stored in the section memory M and the coordinate system is rotated through 90°. Then the algorithm of FIG. 6 is continued until the starting point is reached again. As FIG. 7 shows, in this way the following corner point coordinates of the outer contour are determined: (3,3), (3,11), (10,11), (10,16), (22,16), (22,8), (15,8), (15,3), (3,3). In incremental form these coordinates can be represented as 3, 3, 8, 7, 5, 12, −8, −7, −5, −12, which represent the number of increments of the direction arrows.

If one choses as the starting point $X_o=4$, $Z_o=3$ and the neighboring point in the positive X direction X=5, Z=3, then the same algorithm can be used to obtain the coordinates of the inner contour, as shown in FIG. 8.

Similarly, if the coordinates of the inner contour are represented in incremental form (11, 5, −5, 3, −7, −8), then memory storage capacity is used efficiently with resulting advantages in terms of quick image build-up and excellent flexibility in the choice of the viewer standpoint.

The block diagram of FIG. 9 shows a preferred arrangement for executing the process described above. A digital computer R including a control computer RS and a graphic computer RG is connected by means of data lines D with a memory MA which stores the contour algorithm. In this embodiment the memory MA is an EPROM. The computer R is also coupled via the data lines D with the section memories M, M' which in this embodiment are constructed as a RAM for storing the coordinates of the workpiece sections $Y_o$-$Y_n$ and the tool sections $F_o$-$F_n$.

Additional data lines D connect a so called video controller VC with the digital computer R. The video controller VC is connected by means of respective data lines D' with a picture point memory E1, the image information data of which, however, are not displayed. A second picture point memory E2 contains the image information data for display. These data are transferred from the video controller VC via data lines D'' from the picture point memory E2 to a picture screen CRT and there displayed.

Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

I claim:

1. A method for generating a perspective representation on a display of a machine tool controller of a variable three dimensional structure processed by an object, said method comprising the following steps:

(a) resolving the structure into a plurality of structure sections and storing a first plurality of coordinates which define said structure sections in a section memory;

(b) resolving the object into a plurality of object sections and storing a second plurality of coordinates which define said object sections;

(c) superimposing in an image point memory the structure sections with corresponding ones of the object sections as determined by relative movement between the object and the structure to generate a plurality of modified structure sections;

(d) altering the first plurality of coordinates in the section memory to correspond to a plurality of inner contours defined by the modified structure sections;

(e) superimposing the modified sections in the image point memory with adjacent ones of the modified sections offset from one another in at least one of two orthogonal directions; and (f) determining and displaying a resulting outer contour defined by the superimposed modified sections of step (e).

2. The method of claim 1 wherein the section memory comprises a RAM and wherein the first and second plurality of coordinates are stored in incremental form.

3. The method of claim 1 wherein the image point memory stores information which defines a plurality of pixels which constitute an image.

4. The method of claim 1 wherein a computer generates data used to define relative positions of the structure sections with respect to corresponding ones of the object sections in the superimpositions of step (c).

5. The method of claim 1 wherein the inner contours of step (d) and the outer contours of step (f) are determined automatically by an algorithm responsive to image information stored in the image point memory.

6. The method of claim 1 wherein the object defines at least one oblique contour.

7. An apparatus for generating a perspective representation on a display, wherein the perspective representation is of a variable three dimensional structure processed by an object, the apparatus comprising:
a memory;
a data processing unit comprising:
means for resolving the structure into a plurality of structure sections and storing a first plurality of coordinates which define said structure sections in the memory;
means for resolving the object into a plurality of object sections and storing a second plurality of coordinates which define the object sections;
means for superimposing in the memory region the structure sections with corresponding ones of the object sections as determined by relative movement between the object and the structure to generate a plurality of modified structure sections;
means for altering the first plurality of coordinates in the memory to correspond to a plurality of inner contours defined by the modified structure sections;
means for superimposing in the memory the modified sections with adjacent ones of the modified sections offset from one another in at least one of two orthogonal directions to generate a plurality of offset superimposed modified sections;
means for determining resultant outer contours defined by the offset superimposed modified sections; and
means for displaying the resultant outer contours.

8. The invention of claim 7 wherein the machine tool is controlled in response to data and commands for moving the object relative to the structure; and wherein the means for superimposing the structure sections with the object sections is responsive to the data and commands.

9. The invention of claim 7 wherein the contours are shifted with respect to each other such that the workpiece is represented from a desired viewing angle.

10. The invention of claim 7 wherein selectable portions of the workpiece may be represented with color enhancement.

11. A process for representing a workpiece processed by a numerically controlled tool, the numerically controlled tool of the type responsive to data and commands for the processing of a workpiece, the process comprising:

(a) generating a plurality of first data representative of the contours of a plurality of cross-sections through the workpiece wherein the cross-sections are formed substantially parallel to one another;

(b) generating a plurality of second data representative of the contours of a plurality of cross-sections through the machine tool wherein the cross-sections are formed substantially parallel to one another;

(c) combining the plurality of first and second data in correspondence with the data and commands for controlling the processing of the workpiece by the machine tool;

(d) generating a plurality of third data representative of the inner contours defined by the combined contours;

(e) combining the contours represented by the third data such that each contour is shifted in at least one of two orthogonal directions by a selectable amount;

(f) generating a plurality of fourth data representative of the outer contours of the combined and shifted contours of step (e); and (g) displaying the fourth data.

12. The process of claim 11 wherein the representation of the workpiece is generated and displayed at selectable stages of processing of the workpiece by the numerically controlled tool.

13. The process of claim 11 wherein the contours are shifted with respect to each other by a common selectable amount.

14. The process of claim 11 wherein the contours are shifted with respect to each other such that the workpiece is represented from a desired viewing angle.

15. The process of claim 11 wherein selectable portions of the workpiece are represented.

16. The process of claim 11 wherein selectable portions of the workpiece may be represented with color enhancement.

17. An apparatus for representing a workpiece processed by a numerically controlled tool, the numerically controlled tool of the type responsive to data and commands for the processing of a workpiece, the apparatus comprising:
means for processing data comprising:
means for generating a plurality of first data representative of the contours of a plurality of cross-sections through the workpiece wherein the cross-sections are formed substantially parallel to one another;
means for generating a plurality of second data representative of the contours of a plurality of cross-sections through the machine tool wherein the cross-sections are formed substantially parallel to one another;
means for combining the plurality of first and second data in correspondence with the stored data and commands for controlling the processing of the workpiece by the machine tool;

means for generating a plurality of third data representative of the inner contours defined by the combined contours;

means for combining the contours represented by the third data such that each contour is shifted in at least one of two orthogonal directions by a selectable amount;

means for generating a plurality of fourth data representative of the outer contours of the combined and shifted contours; and means for displaying the fourth data.

18. An apparatus for generating a perspective representation on a display wherein the perspective representation is of a variable three dimensional structure processed by an object responsive to data and commands, the apparatus comprising:

computational means to generate and store coordinate data of the contours of a plurality of sections through the structure and through the object;

a first image point memory region;

a video controller operable to write the contours of the structure and the object in the first image point memory region such that selected contours of the structure and of the object are superimposed on one another in accordance with the data and commands; and a second image point memory region;

the computational means in communication with the first image point memory region and further operative to generate data representative of the outer and inner contours resulting from the superimposed contours and to transfer the data to the second image point memory region;

the video controller, computational means and the first and second image point memory region cooperating to display a three dimensional representation of the processed structure.

* * * * *

UNITED STATES PATENT AND TRADEMARK OFFICE
CERTIFICATE OF CORRECTION

PATENT NO.  : 4,791,579
DATED       : December 13, 1988
INVENTOR(S) : Walter Kranitzky It is certified that error appears in the above-identified patent and that said Letters Patent is hereby corrected as shown below:

On the cover page, under the heading "U.S. PATENT DOCUMENTS" and after "340/728", on the next line please insert
--3,925,776  12/1975  Swallow .................. 340/703--.

On the cover page, under the heading "FOREIGN PATENT DOCUMENTS" and after "Fed. Rep. of Germany", on the next line please insert --2,738,441  3/1979   West Germany ................
  089,561    9/1983   EPO .........................
  089,562    9/1983   EPO .........................--.

On the cover page, under the heading "OTHER PUBLICATIONS" and after "1977", on the next line please insert
--Video Display Processor Simulates Three Dimensions,
     Electronics/November 20, 1980, Karl Guttag & John Hayn

UNITED STATES PATENT AND TRADEMARK OFFICE
CERTIFICATE OF CORRECTION

PATENT NO. : 4,791,579
DATED : December 13, 1988
INVENTOR(S) : Walter Kranitzky

It is certified that error appears in the above-identified patent and that said Letters Patent is hereby corrected as shown below:

```
Pioneering in Technology .... Proceedings 17th Numerical
    Control Society Annual Meeting & Technical Conference,
    April 27-30, 1989, Computer Verification of Machine
    Control Data by Lawrence O. Ward
Yamazaki Machinery Works, Ltd.; MAZAK; MAZATROL T-1--.
```

Signed and Sealed this

Eighth Day of October, 1991

*Attest:*

HARRY F. MANBECK, JR.

*Attesting Officer*     *Commissioner of Patents and Trademarks*